No. 658,253. Patented Sept. 18, 1900.
A. G. W. FOSTER, Sr.
CORN AND COTTON FENDER.
(Application filed May 7, 1900.)
(No Model.)
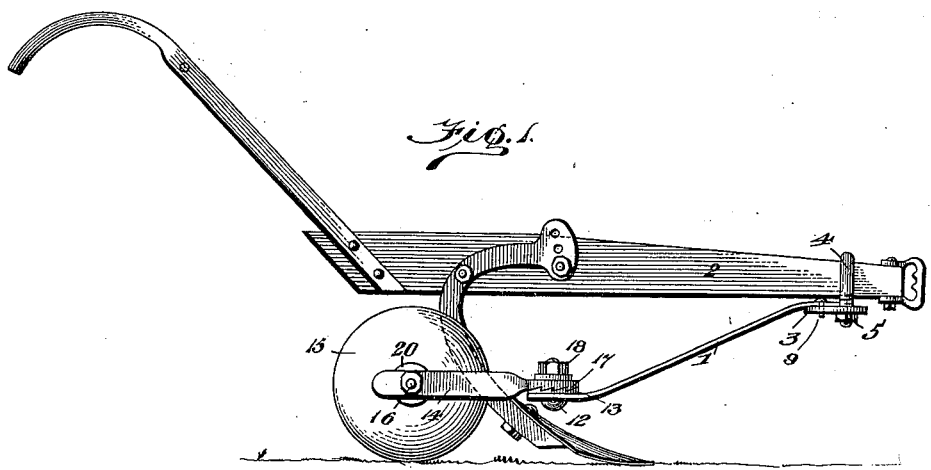
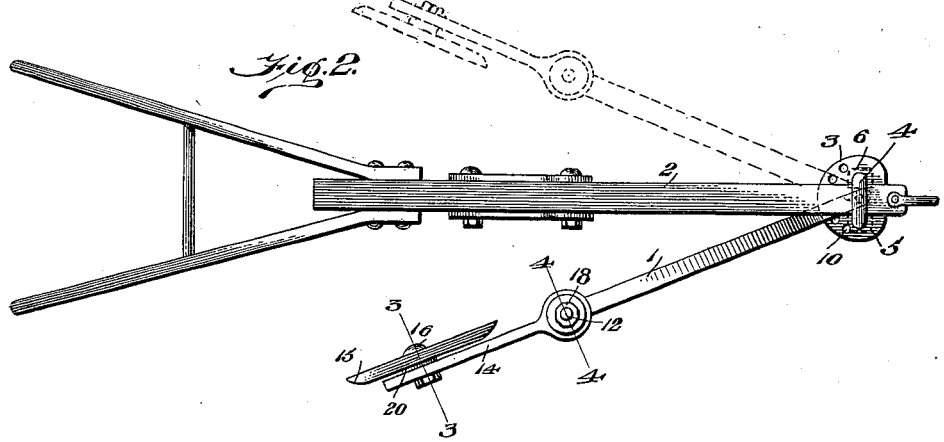
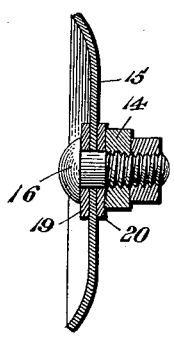
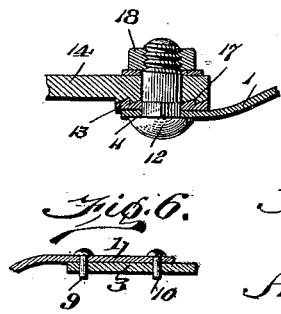
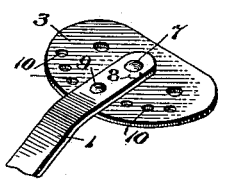
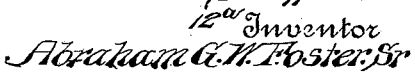
Witnesses
H. S. Dieterich
B. F. Funk
Inventor
Abraham G. W. Foster, Sr.
By Victor J. Evans
Attorneys

UNITED STATES PATENT OFFICE.

ABRAHAM G. W. FOSTER, SR., OF POWELLVILLE, GEORGIA, ASSIGNOR TO HENRY C. FISHER AND JOSEPH E. FEATHERSTON, OF NEWNAN, GEORGIA.

CORN AND COTTON FENDER.

SPECIFICATION forming part of Letters Patent No. 658,253, dated September 18, 1900.

Application filed May 7, 1900. Serial No. 15,770. (No model.)

*To all whom it may concern:*

Be it known that I, ABRAHAM G. W. FOSTER, Sr., a citizen of the United States, residing at Powellville, in the county of Coweta and State of Georgia, have invented new and useful Improvements in Corn and Cotton Fenders, of which the following is a specification.

This invention relates generally to plows, but more particularly to corn or cotton fenders; and the primary object thereof is to provide a device of the character described which will recommend itself to the trade on account of the simplicity of construction, durability, and adaptability to perform the work for which it is intended.

Having this object in view, my invention, briefly stated, consists in arranging an adjustable spring-arm on a plow stock or beam of ordinary construction and providing the free end of the said spring with a disk-carrying arm, whereby the disk can be adapted to various angles to suit various conditions arising and incident to its successful operation.

Minor details of construction and peculiar combinations of parts also form features of my invention, and these can be understood by reference to the following description and accompanying drawings, in which—

Figure 1 is a side elevation of a plow with my invention applied. Fig. 2 is a top plan view of the same. Fig. 3 is a detail section of the fender and its support, the axle being shown in elevation. Fig. 4 is a similar view through the connections of the two arms. Fig. 5 is a detail perspective of the front adjusting-plate and a portion of the spring-arm. Fig. 6 is a vertical longitudinal section through the same, and Fig. 7 is a modified form of connecting the two arms.

The spring-arm (designated by the reference-numeral 1) is adjustably secured to a plow-stock 2 by means of a securing-plate 3, held to the stock by a yoke 4, passing around it and connected to the plate through the medium of nuts or burs 5 and 6. The pin or lug 7 on one end of the arm and fitting in the opening 8 in the plate is designed to act as a fulcrum when it is desired to adjust the disk, as will be presently explained.

9 designates a lug or pin designed to engage in one of a plurality of perforations 10 and is provided to hold the arm rigidly with relation to the plow-stock after the required adjustment is obtained.

The spring-arm 1 is curved downwardly intermediate its ends, and at or near its free end a square opening 11 is provided to receive the square shoulder on the bolt 12, which engages therein. This shoulder only extends up flush with the upper face of the ratchet-faced plate 13, sleeved thereon to prevent its turning, the reduced portion of the bolt being engaged by a supplemental arm 14, carrying a concavo-convex disk 15, which rotates on the stub-axle 16, carried thereby. The end of the arm 14 which engages the bolt is flattened and is provided with a series of ribs or ratchets at 17 to correspond with and engage the ratchets of the face-plate 13, so that when the nut 18 is screwed down upon the bolt both arms will be rigidly connected; but when the nut is unscrewed the supplemental arm may be turned at any angle with relation to the arm 1.

In Fig. 7 I have shown the bolt $12^a$ as threaded in the arm 14 and secured by a jam-nut $18^a$. This construction affords a cheap, simple, and durable joint.

To strengthen the disk 15 and form a hub therefor, I arrange on either side one of two plates 19 and 20, which are riveted to the disk and form bearings therefor on the stub-axle.

From the foregoing it will be seen that the disk is spring-supported, so that it will readily pass over any obstructions, and, owing to the ratchet-joint, said disk may be set at any angle from a position parallel with the longitudinal center of the plow-beam to a right angle thereto, so that the quantity of soil acted upon by the disk can be regulated to suit varying conditions, and the revolving disk can be worked close to young plants without covering them too much, as no dirt will pass on the right or convex side of the disk when it is adjusted at a right angle to work across the furrow.

Attention is directed to the fact that the plate 3 is provided with the perforations 10 in the arc of a circle and the series extends on either side of the plow-beam, so that, if desired, as for cultivating corn, the arms and disk can be shifted from the right to the left side of the plow. By simply loosening the nuts 5 and 6 the pin 9 can be withdrawn from engagement with one of the openings 10 and the whole device swung around on the pin 7. The pin 9 is then inserted in the opening, and the device is operated for the purpose intended.

I claim—

1. A fender comprising a spring-arm connected to a plow-beam, a ratchet-plate secured to the free end of said arm, and a supplemental disk-carrying arm arranged on said spring-arm and provided with means for engaging the ratchet-plate whereby the disk can be arranged on an angle with relation to the beam.

2. A fender comprising a spring-arm adapted to be adjustably secured to a plow stock or beam, a supplemental arm carried by the free end of said spring-arm, a disk journaled to the supplemental arm and means for adjusting the two arms with relation to each other.

3. The combination with a plow-beam, of a perforated plate secured thereto, a spring-arm having lugs or pins at one end to engage the perforations in the plate, whereby the arm can be adjusted on either side of the beam, and a disk carried by the free end of said spring-arm.

4. The combination with a plow-beam, of a perforated plate secured thereto, a spring-arm adjustably engaging the perforations in said plate, a ratchet-plate arranged on the free end of said arm, a supplemental arm engaging the ratchet-plate and a fender carried by the free end of the supplemental arm.

In testimony whereof I affix my signature in presence of two witnesses.

ABRAHAM G. W. FOSTER, Sr.

Witnesses:
   JOS. E. FEATHERSTON,
   HARVEY H. NORTH.